UNITED STATES PATENT OFFICE.

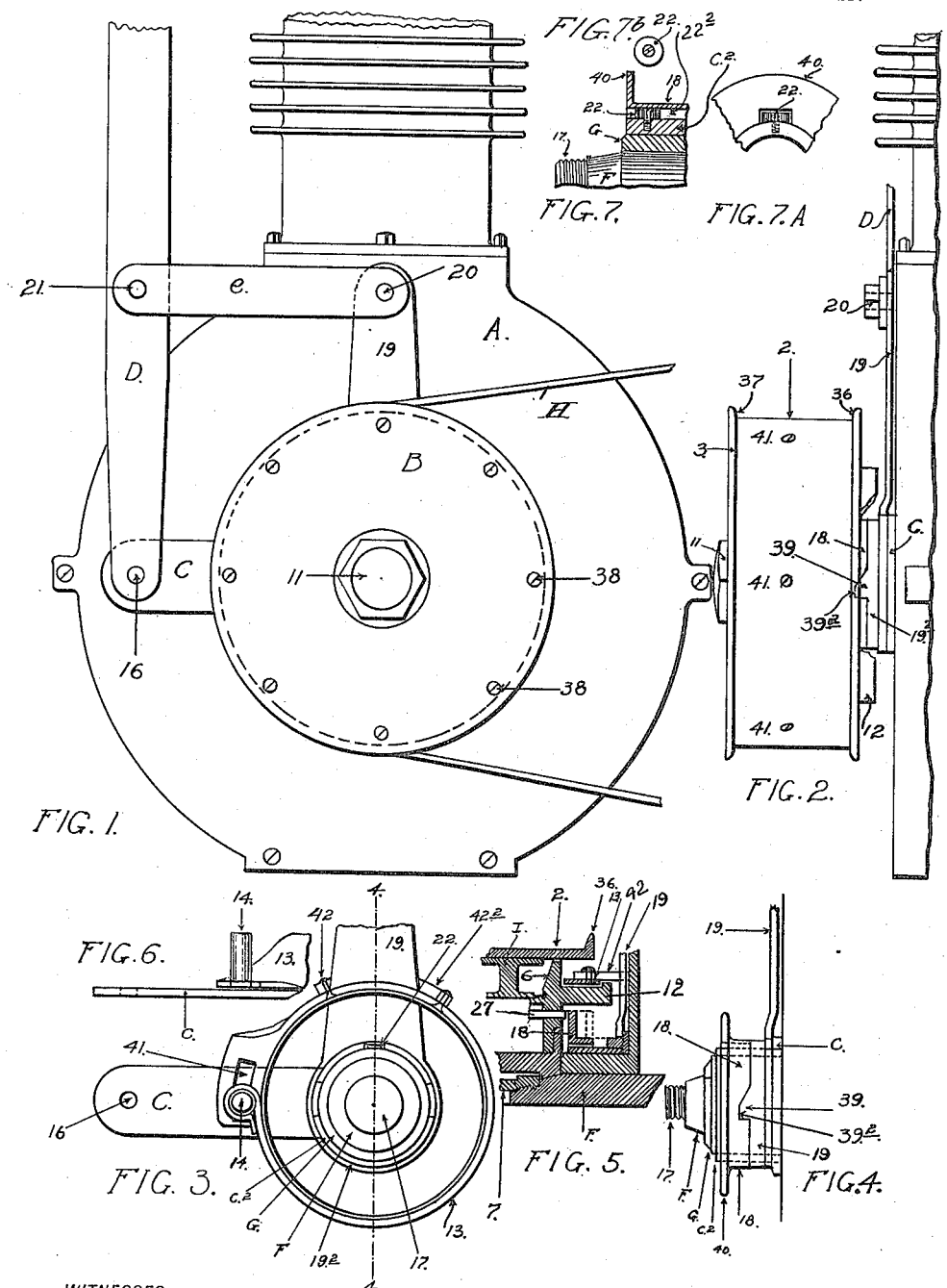

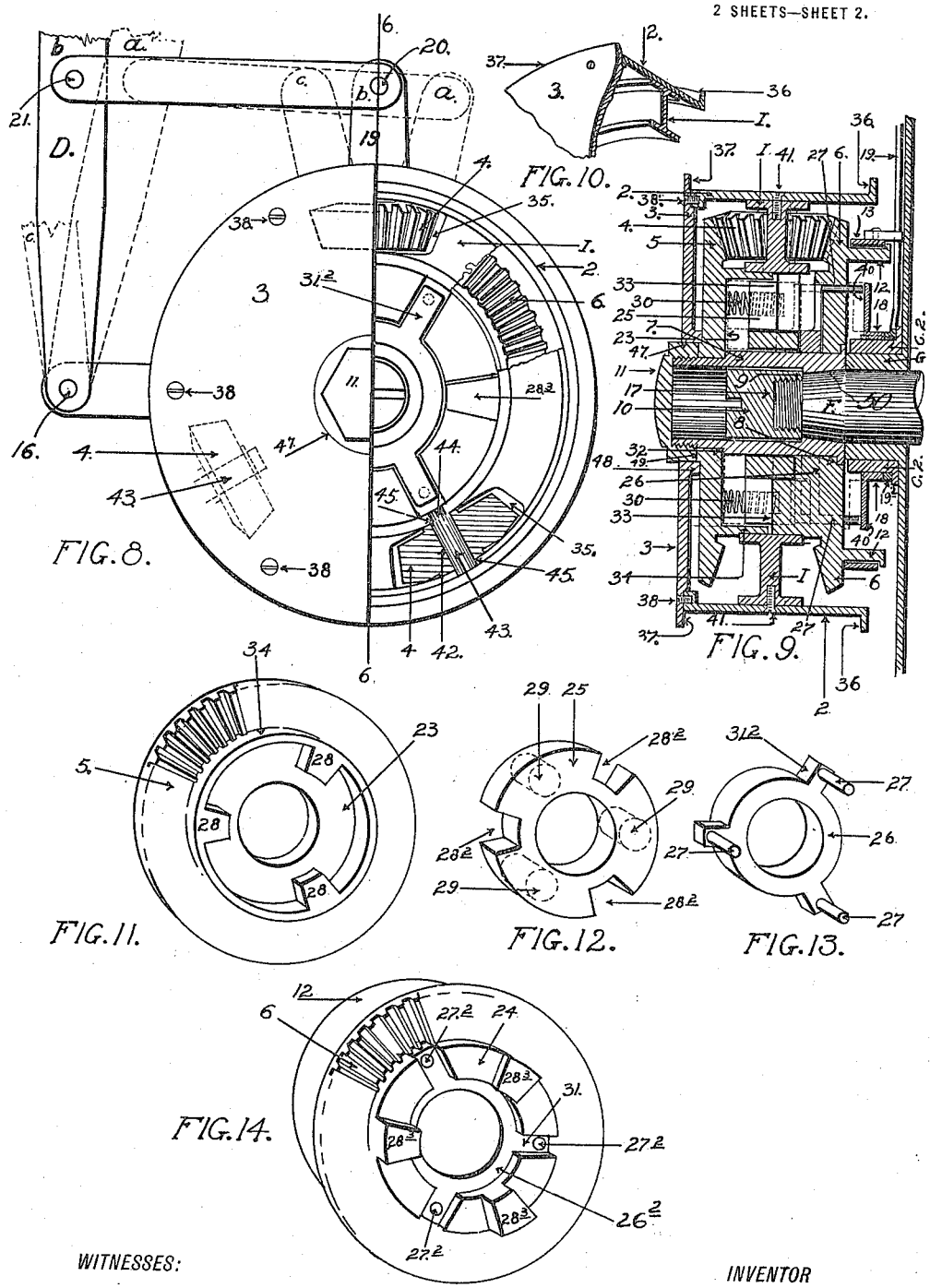

CHARLES R. WOOD, OF SPOKANE, WASHINGTON, ASSIGNOR OF ONE-HALF TO CHARLES W. MILLER, OF PORTLAND, OREGON, AND JOSEPH D. ALEXANDER, OF SPOKANE, WASHINGTON.

VARIABLE-SPEED-TRANSMISSION MECHANISM.

1,158,357.  Specification of Letters Patent.  Patented Oct. 26, 1915.

Application filed April 16, 1912. Serial No. 691,168.

*To all whom it may concern:*

Be it known that I, CHARLES R. WOOD, a citizen of the United States, residing at East 2313 Fifth avenue, in the city of Spokane, county of Spokane, and State of Washington, have invented a new and useful Variable-Speed-Transmission Mechanism, of which the following is a specification.

My invention relates to appliances of that particular character in which mechanism is provided for transmitting power at variable rates of speed and providing for a free-engine without the necessary use of an idler, countershaft or friction clutch; said mechanism consisting of a ring-shaped frame adapted to either rotate at variable speeds or to remain neutral with respect to the driving shaft, and means including a differential and compensating gear mechanism, and a locking and controlling mechanism whereby said frame may at the will of the operator be made either to commence rotating, to vary its rate of speed, or to cease rotating entirely thereby providing a free-engine, while the engine shaft or other prime driving element is in full and constant motion and with the gears of said transmitting appliance always in full mesh.

Generally stated, the object of my invention is to provide a novel and comparatively simple arrangement of mechanical parts consisting of a power transmitting ring-shaped frame in combination with a differential and compensating gear whereby the speed may be varied or a free-engine provided at any time.

Special objects are to provide a light, durable, compact and easily controlled and operated variable speed transmission and free-engine device adaptable to any motor vehicle or machine; to provide an appliance supplying two or more speeds and a free-engine for any vehicle without the necessary use of an idler, countershaft, belt-tightener or friction clutch and with the gears of the appliance always in full mesh thereby supplying a positive power and lessening the danger of breaking the cogs; and to provide certain details and features of improvement tending to increase the general efficiency of appliances of this particular character.

The device will be especially useful on all road and hill climbing machines for it will enable the driver to make his machine travel at a slow rate of speed while his engine is running at full speed and thereby supplying its maximum power. This feature of the machine alone, that is to say, supplying a variable but always positive speed with the engine on full speed, makes the appliance of inestimable value to every kind of machinery in the operation of which the transmission of power is a factor. The free-engine feature of the appliance makes it of great value to all forms of machinery where heretofore an idler, belt-tightener or friction clutch has been used.

To the foregoing and other useful ends, my invention consists of matters hereinafter set forth and claimed.

In the accompanying drawings, Figure 1 is a side elevation of the improved device showing its adaptation by direct connection to the engine of a motorcycle, the upper portion of controlling and shifting lever D being broken away. Fig. 2 is a rear view of the appliance as shown in Fig. 1, with parts broken away to exhibit members 18 and 19 of shifting and controlling device. Fig. 3 is a side elevation of assembled parts consisting of supporting arm C, band brake 13, and shift lever 19. Fig. 4 is an end view of the assembled parts C and 19 as shown in Fig. 3. Fig. 5 is a vertical cross section of parts taken substantially on the line 4—4 of Fig. 3. Fig. 6 is a bottom view of members C and 13 with parts broken away and showing pin 14. Fig. 7 is a vertical cross section taken substantially on the line 4—4 of Fig. 3 on a slightly enlarged scale showing roller 22, and groove $22^2$ in collar 18. Fig. $7^A$ is a side view of a portion of collar 18 showing its flanged or disked side 40 and showing roller 22 in place in groove $22^2$. Fig. $7^b$ is a top view of roller 22. Fig. 8 is a side elevation of the device with a part of pulley shell 3 cut away showing gear wheel 6 and pinions 4 in place, and showing the relative position of the shift levers when operated. Fig. 9 is a cross section of the device taken substantially on the line 6—6 of Fig. 8. Fig. 10 is a view of the ring-shaped frame in section showing the I-beam frame 1, pulley surface 2 and pulley shell 3. Fig. 11 is a perspective of the outside gear wheel 5 showing its inner face with portions of its cogged surface broken away. Fig. 12 is a perspective of clutch dog 25. Fig. 13 is a perspective of clutch collar or follower 26. Fig. 14 is a perspective of the inside gear wheel 6 showing its inner face with portions of its cogged surface broken away.

As thus illustrated the device consists primarily of a driving mechanism including two comparatively large drive gear wheels 5 and 6 operatively connected with the engine shaft F, clutch dog 25 and pinions 4 mounted in the I-beam ring; a driven mechanism including a ring-shaped frame comprised of I-beam ring member 1 and pulley surface 2 and shell 3 attached thereto; and a controlling mechanism comprising the several parts hereinafter more fully designated.

Referring to the drawings, A in Fig. 1 designates the lower portion of a motor cycle engine, and B the rotating portion of the improved device attached to the engine shaft.

C represents a supporting member comprising a long flat arm that is secured to the shell of the engine at a proper distance from the shaft F, the point 16 of said connection being the point where controlling lever D is pivotedly connected to said shell; and a hub-shaped end $C^2$ adapted to fit tightly the engine hub G (Figs. 3, 4 and 9) and projecting outwardly and having its outer circumference adapted to form a bearing or journal on which shifting members 18 and 19 are mounted.

In Fig. 9 a hollow shaft 7 is shown attached to the driving shaft F of the motorcycle engine. It is shown in this instance as secured to the engine shaft by a tapering fit and is held in place by the nut 10 screwed to the threaded end 17 of the engine shaft, the inside face of the nut pressing against the shoulder 9 of hollow shaft 7. Shaft 7 being thus secured to the engine shaft always turns with it. It is to be noted that in cases where the engine or other driving shaft is long enough to accommodate the appliance this hollow shaft member need not be used. The outside circumference of shaft 7 is adapted to form a bearing for the large gear wheel 6, clutch dog 25 and clutch collar 26. It has a shoulder 8 on its inside end adapted to hold gear wheel 6 in place, and a shoulder 32 near its outer end which serves to prevent gear wheel 5 from moving inwardly. A disk or nut 11 is detachably secured to the outer end of shaft 7 preferably by threads as shown in the drawing. The outside circumference of said disk or nut 11 is adapted to rotate freely in the opening or hole in pulley shell 3. The inside end of said nut serves to hold wheel 5 in place and prevent it from moving outward on shaft 7. Said nut also serves to prevent dust or other foreign substances from getting into hollow shaft 7.

The outside gear wheel 5 is shown in this instance as securely fixed to shaft 7 by a tapering fit and is held in place by nut 11 as previously stated, though it may be secured to said shaft in any other known, suitable or approved manner. It is shown with bevel cogs or teeth on the outer rim of its inside face the same being adapted to engage counterpart cogs in pinions 4. On the inner portion of the inside face of wheel 5 is the recess 23 with clutch jaws 28 protruding therein toward the center of the wheel, said recess and protruding jaw members being adapted to exactly receive and engage clutch dog member 25. When not engaged on clutch jaws $28^3$ on wheel 6, the outer face of said clutch dog 25 is flush with the inner surface of wheel 5 as described by the outer surface of clutch jaws 28, said dog being held in place by clutch collar or follower 26 and having resilient means for causing it to move outwardly from wheel 5 when not pressed into recess 23 by collar 26, preference being given to three helix springs 30 adapted to fit into the three recesses 29 made in the inner face of dog 25 substantially as shown in the drawing. It is to be noted here that wheel 5 is the principal driving wheel of the device and that with clutch dog 25 it always revolves with the engine shaft.

The inside gear wheel 6 is snugly mounted on shaft 7 and adapted to turn freely thereon, the shaft acting as a bearing for the wheel. It has a cogged surface on its inner face that corresponds to the cogged surface of wheel 5, said cogs being adapted to engage counterpart cogs in pinions 4. On the inner portion of the inside face of wheel 6 are the three clutch jaws $28^3$ adapted to be operatively engaged by the corresponding notches $28^2$ in clutch dog 25, and recess $26^2$ adapted to receive clutch collar or follower 26, the three pins 27 of said clutch follower passing through the three holes $27^2$ made through wheel 6 at the bottom of said recess $26^2$, and pressing against the inside face of flange 40 of shift member 18. On the outside face of wheel 6 is a projecting rim or flange 12 with its outside circumference adapted to be frictionally engaged by brake member 13. It is to be observed that wheel 6 will rotate with wheel 5 when clutch dog 25 is engaged on clutch jaws $28^3$ of said wheel 6, and that when not so engaged with wheel 5 and when not held fast by brake member 13 it will revolve easily on shaft 7, its function being both that of a drive wheel and of a differentiating and compensating wheel.

The body 1 of the ring-shaped frame is, in section, preferably shaped like an I-beam as clearly appears in Fig. 10. It has its outside and its inside circumference machined or otherwise prepared to make it balance and to revolve truly around the common center described by engine shaft F.

Said ring member 1 fits in between gear wheels 5 and 6, its inside circumference being adapted to fit neatly around the periphery of rim or hub 34 on wheel 5 and of clutch jaws $28^3$ on wheel 6 and to rotate around them. It is also provided with openings 35. Meshing with the gear wheels 5 and 6 are bevel gear pinions 4 having tubular openings 42 journaled on shafts or spindles 43 which are formed into pintles 44 at their inner ends, said spindles 43 passing through the holes 45 in ring 1 and having their pintled ends flush with the inside circumference of said ring 1 and their outer ends flush with the outside circumference thereof and pressing against pulley shell 2 and thereby held in place in ring 1. The pinions are equal in number to the openings in ring 1 and are adapted to rotate easily therein on the respective spindles. By this arrangement the pinions are connected with the ring-shaped frame to rotate therewith or independently thereof. It is to be understood that any desired number of pinions may be used, it being possible to operate the device with but one pinion, and that they may be mounted in the ring member 1 in any desired or approved manner other than as shown. Suitable means for transmitting the power is secured to the I-beam ring. The means used in this instance is by a belt mechanism H as shown in Fig. 1. Pulley surface 2 is a circular member fitted tightly around the periphery of I-beam ring 1 and detachably secured thereto by suitable means, that adopted being by screws 41 the heads of which are counter sunk into the pulley surface 2 so as to not interfere with the operation of the transmitting belt, and the threaded ends of which are screwed into suitable threaded openings in the I-beam ring. The outer circumference of member 2 is smooth and wide enough to accommodate whatever size belt is to be used and has its inner edge turned or flared upward thus forming a rim 36 adapted to prevent transmitting belt H from running off the pulley surface on the inner side of the device. Pulley shell 3 is a thin disk with an opening 47 on the inside edge of which is a flanged extension 48 of said shell. This opening 47 is adapted to form a boxing in which nut 11 and the protruding hub 49 of wheel 5 rotate. Shell 3 is so constructed that its outer rim extends slightly past the pulley surface 2 and thereby forms a flange or rim 37 that serves to prevent transmitting belt H from running off the pulley surface on the outside of the device. This disk may be secured to the pulley surface in any desired manner, it being shown as detachably secured thereto by screws 38 having their heads counter sunk into the shell 3 and their threaded ends engaged in correspondingly threaded holes in the side of said pulley surface 2. This disk or shell braces up the pulley rim 2 and forms an outside casing for the device thereby preventing the dust and grit from getting into the gearing. It is to be observed that it may also be adapted to and used for transmission purposes in cases where it is not desirable to take the power from the rim of the device. It is further pointed out that pulley surface 2 may be adapted to transmit power by any other known or suitable means than by a belt as shown in the drawing, and further, that said surface 2 may be an integral part of I-beam ring 1 or fixedly attached thereto, the method of construction used being merely a convenient means of adapting the device to a motorcycle. It is also noted that when other means are used for locking wheels 5 and 6 than the method herein shown, the ring-shaped frame may be mounted directly on shaft 7, without in any way departing from the spirit of my invention.

Shifting member 18 consists of a collar or sleeve with a flared or flanged rim or side 40 adapted to press against the projecting ends of pins 27 of clutch collar or followers 26 its contact surface being smooth and true to allow said pins to slide freely thereon at all times. It is noted here that suitable means may be provided to further facilitate the movement of said pins 27 over the face of said flange 40. The collar or sleeved portion of member 18 has a notch 39 in its outer rim, said notch being adapted to receive tooth $39^2$ projecting from the rim of member 19. Said member 18 is adapted to fit snugly around supporting hub $C^2$ and to slide back and forth freely thereon toward and away from wheel 6. It has a groove $22^2$ cut transversely across its inside surface. Roller member 22 is, as shown in Figs. 7 and $7^A$ detachably secured to hub $C^2$ by a screw and adapted to turn freely thereon and to fit neatly into groove $22^2$ in member 18. By this means member 18 is prevented from revolving on hub $C^2$ and its inward and outward movement on said hub is greatly facilitated.

Shifting member 19 comprises a long flat arm or lever that extends above the revolving portion of the device, as shown in Fig. 1, and a hub-shaped end $19^2$ adapted to fit snugly around and to move rotatively on hub $C^2$. The outside rim or shoulder of end $19^2$ fits closely up against the shoulder of hub $C^2$ and is held in place thereby. Projecting outwardly from the edge of the inside rim of end $19^2$ is a tooth $39^2$ adapted to engage notch 39 in member 18. It is to be noted that the mesh of tooth $29^2$ in notch 39 corresponds with the mesh of clutch jaws $28^3$ in notches $28^2$ of clutch dog 25 when that member is in locked relation with wheel 6, and that when lever 19 is shoved forward until tooth $39^2$ has moved out of notch 39 shifting member 18 will have been shoved inwardly toward wheel 6 and will have caused clutch follower 26 to have pressed clutch dog 25 out of locked relation with wheel 6 and home in recess 23 of wheel 5, thus leaving wheel 6 loose on hub 7, and that when said lever 19 is moved back to place tooth 39² will be again engaged in notch 39 and spring members 30 will shove clutch dog 25 outward and cause it to again engage on clutch jaws 28³ on wheel 6.

Band brake member 13 may be made of any suitable resilient material, but is preferably made of soft band iron. It has one end fixedly attached to pin 14 on member C as shown in Fig. 3. The other end of the brake is turned flatwise to arm C and has in it a slot 41 adapted to pass loosely over pin 14 between the fixed end of the brake and arm C, and adapted to slide freely up and down on said pin 14 when the brake is operated. The brake is generally the same width as flange or hub 12 of wheel 6 and is adapted to engage the periphery of said rim when said brake is operatively brought in contact therewith. A strap or yoke with two arms 42 and 42² is securely riveted, or otherwise fastened, to the outer surface of brake 13, said strap passing behind shift lever 19, as shown in Fig. 3, thus forming a slot in which said lever will operate freely. The strap serves to hold the brake in place at this point and supplies the contact means by which it is operated. The front arm 42 of said strap or yoke is so placed as to allow shift lever 19 to move forward until tooth 39² has moved out of notch 39 and thereby released wheel 6 from locked relation with wheel 5, so that said wheel 6 may rotate freely either backward or forward on shaft 7 without coming in contact with said brake member 13. When wheel 6 has been released from wheel 5 as just described, any further forward movement of lever 19 brings it in contact with said arm 42 and causes brake member 13 to tighten around the flange or hub 12 of wheel 6.

Controlling lever D is constructed of suitable dimensions and material to operate, and is adapted to operate the shifting, locking and controlling members of the device. It is pivotedly connected to the shell of the engine at 16 as shown in Fig. 1, and is operatively connected with shift lever 19 by a rigid member E made of suitable material and dimensions. Said bar is pivotedly connected to said levers D and 19 at points 21 and 20 respectively, and thus allows said levers to move backward and forward in unison. Lever D extends upward to any desired height where it can be conveniently operated by the driver of the motorcycle when mounted on the machine. The top of the lever is held in place by a ratchet mechanism constructed and secured to the motorcycle frame in any suitable, known or approved manner.

The device may be provided with ball or other form of approved bearings in all bearings of the device that are adapted to the same, and is to be provided with suitable means for lubricating all frictional parts that require lubrication. The different parts of the device are to be made of any suitable material, preference being given to nickel steel in cases where the device is to be adapted for use on motorcycles and machines of like character.

In the operation of my invention it will be seen that when controlling lever D is in the relative position indicated by dotted lines $a$ in Fig. 8, clutch dog 25 will be engaged on clutch jaws 28³ of wheel 6 and the two drive wheels 5 and 6 will be locked together and hence all the gears will be fixed with relation to each other and to the driving shaft and will transmit motion in the direction the engine shaft revolves and at the same speed. The device is when in this position on high or full speed. When shift lever D is carried forward to relative position $b$ as shown in the drawing, tooth 39² will have passed out of notch 39 thereby having caused member 18 to move inwardly shoving clutch follower 26 before it which will in turn have pushed clutch dog 25 home in recess 23 of wheel 5 and released wheels 5 and 6 from their locked relation with each other, leaving wheel 6 free to rotate on shaft 7. When shaft 7 is revolving at the normal speed of a motorcycle engine wheel 6 will have a slight tendency to revolve, due to the friction of the revolving shaft inside the hub of said wheel. This friction will be overcome by the friction of the transmitting belt H on the surface of the pulley surface, and wheel 5 will when revolving forward cause pinions 4 to revolve, and these revolving pinions will transmit motion to wheel 6 and cause it to revolve in an opposite direction from and at the same speed as said wheel 5, and the ring-shaped frame will remain neutral with respect to the rotating drive gear. As the engin is going at full speed, and the power transmitting frame is stationary and not moving at all, the device when in this position may be said to be supplying or providing a free engine. When lever D is moved further forward to relative position C as shown in the drawing, brake 13 will have clamped tightly around hub 12 of wheel 6 thereby holding said wheel in a fixed position. The revolving wheel 5 will transmit motion to pinions 4 and force them to travel around in the cogged surface of wheel 6 thereby causing the transmitting frame to move at one half the speed of wheel 5. The device when in this position may be said to be on intermediate speed due to the differential movement of the driving gear. Other different variations of speed may be obtained from the device in its form as shown by regulating the pressure of brake 13 on rim or hub 12 so as to allow wheel 6 to move at different shades of speed.

It is to be noted that the success of the device does not necessarily depend on the efficiency of the brake mechanism, but that other suitable and convenient means for positively locking wheel 6 may easily be provided, as for instance, by the use of a pin or key. It is further pointed out that bevel gears need not necessarily be used, but that the same results may be accomplished by the use of a combination of spur gears, and that by arranging the pinions in pairs fixedly mounted on revolving shafts the drive wheels 5 and 6 need not necessarily be of the same size. That the power transmitting frame may be constructed in various ways, its chief requirements being rigidity, and adaptability to rotate in conjunction with the gear wheels. That the power may be transmitted from the rotating frame through the gearing to the shaft, or transmitted from the side of the pulley shell as well as from the pulley surface thus making it possible to connect up any desired number of units like the one described, and thereby obtaining any variation of positive speeds without departing from the spirit of my invention. I do not, therefore, limit myself to the exact construction shown and described.

What I claim as my invention is:

1. In a motorcycle, the combination with a motor shaft, of a revoluble frame with pinions rotatably mounted internally of the rim thereof, and means located externally of said rim for transmitting power therefrom, a drive gear mechanism revolubly mounted internally of said frame and comprising a shaft operatively connected with said motor shaft, two gear wheels, one fixedly and one loosely mounted on said shaft and meshing with said pinions, and having recesses and clutch jaws protruding outwardly from the recesses in each of said gear wheels, a clutch mechanism for placing said gear wheels into and out of locked relation with each other, and comprising a clutch dog resiliently supported in the recess in said fixedly mounted gear wheel and engaged on said clutch jaws therein and adapted to move outwardly from said recess and engage the clutch jaws on said loosely mounted gear wheel, a clutch follower mounted in the recess of said loosely mounted gear wheel and pressing against said clutch dog and having pintles passing through holes in said gear wheel; and a controlling means coming in operative contact with said pintles whereby said clutch is operated.

2. In a motorcycle, the combination with a motor shaft, of a gear mechanism, including a hollow shaft operatively connected with said motor shaft, two drive gear wheels, one fixedly and one loosely mounted on said hollow shaft, a rigid I-beam ring, incasing said gear mechanism and mounted for revoluble motion around said gear wheels, and having means located externally of said I-beam ring for transmitting power therefrom, pinions rotatably mounted internally of said I-beam ring and meshing with said gear wheels, a clutch mechanism for placing said gear wheels into and out of locked relation with each other and comprising a clutch dog resiliently supported in the recess in said fixedly mounted gear wheel and engaged on said clutch jaws therein and adapted to move outwardly from said recess and engage clutch jaws on said loosely mounted gear wheel, a clutch follower mounted in the recess of said loosely mounted gear wheel and pressing against said clutch dog and having pintles passing through holes in said gear wheel; and a controlling means coming in operative contact with said pintles whereby said clutch is operated.

3. In a variable speed transmission mechanism the combination of a revoluble frame with pinions rotatably mounted internally of the rim thereof, and means located externally of said rim for transmitting power therefrom with means for rotating said frame including a drive gear mechanism revolubly mounted internally of said frame, and comprising a shaft, two gear wheels, one fixedly and one loosely mounted on said shaft and meshing with said pinions and having recesses and clutch jaws protruding outwardly from said recesses, a clutch mechanism for placing said gear wheels into and out of locked relation with each other, and comprising a clutch dog resiliently supported in the recess in said fixedly mounted gear wheel and engaged on said clutch jaws therein and adapted to move outwardly from said recess and engage clutch jaws on said loosely mounted gear wheel, a clutch follower mounted in the recess of said loosely mounted gear wheel and pressing against said clutch dog and having pintles passing through holes in said gear wheel; and a controlling means coming in operative contact with said pintles whereby said clutch is operated.

4. In a variable speed transmission mechanism the combination of a revoluble power transmitting frame with pinions rotatably mounted internally of the rim thereof; with a drive gear mechanism revolubly mounted internally of said frame, and comprising a shaft, two gear wheels, one fixedly and one loosely mounted on said shaft, and meshing with said pinions; a clutch mechanism for placing said gear wheels into and out of locked relation with each other; a fixed support adjacent to the device; a controlling mechanism operatively connected with said clutch mechanism and comprising a supporting arm anchored at one end to said fixed support and having its other end fitted loosely over said shaft said end having a projecting hub, a collar loosely mounted on said hub and adapted to move inwardly and outwardly thereon, said collar having a smooth outer rim coming in operative contact with said clutch mechanism, and having a toothed inner surface, a shift lever revolubly mounted on said hub and having a toothed outer surface adapted to fit into and operatively engage the toothed surface of said collar, means for moving said lever rotatively on said hub whereby said collar is pressed inwardly to operate said clutch mechanism and thereby placing said gear wheels out of locked relation with each other; and frictional means for controlling said loosely mounted gear wheel.

5. In a variable speed transmission mechanism the combination with a revoluble frame comprising a rigid member with pinions rotatably mounted internally of the rim thereof and means located externally of said rim for transmitting power therefrom; of a drive gear mechanism revolubly mounted internally of said frame and comprising a shaft, two gear wheels, one fixedly and one loosely mounted on said shaft, and meshing with said pinions, said loosely mounted gear wheel having a flange protruding from its outer face; a clutch mechanism for throwing said gear wheels into and out of locked relation with each other; a shifting mechanism operatively connected with said clutch mechanism; a fixed support adjacent to the device; a supporting arm anchored at one end of said fixed support and having its other end fitted loosely over said shaft, said end having a projecting hub; and a controlling mechanism comprising a lever rotatively mounted on the hub of said supporting arm, a resilient member having one end detachably anchored to said supporting arm and passing around the periphery of said flange on said loosely mounted gear and having the other end turned flatwise to said supporting arm and adapted to pass loosely between the anchored end of said resilient member and said supporting arm, said resilient member being operatively connected with said lever and adapted to operation in conjunction with said clutch mechanism for the purpose of controlling said loosely mounted gear wheel.

6. A variable speed transmission mechanism comprising a fixed axle, two gear wheels, one fixedly and one loosely mounted on said axle and having oppositely disposed toothed inner surfaces, and also recesses and clutch jaws, a rotating frame disposed above said gear wheels, pinions rotatably mounted internally of the rim of said frame and in meshed engagement with the teeth on said gear wheels; a clutch mechanism for placing said gear wheels into and out of locked relation with each other and comprising a clutch dog resiliently supported in the recess in said fixedly mounted gear wheel and engaged on said clutch jaws therein and adapted to move outwardly from said recess and engage the clutch jaws on said loosely mounted gear wheel, a clutch follower mounted in the recess of said loosely mounted gear wheel, and pressing against said clutch dog and having pintles passing through holes in said gear wheel; and a controlling means coming in operative contact with said pintles whereby said clutch is operated.

In testimony whereof I affix my signature to this specification in the presence of two witnesses.

CHARLES R. WOOD.

Witnesses:
E. A. CORNELIUS,
R. W. TOMPKINS.